Jan. 31, 1939.   F. MILLIKEN   2,145,628
LUBRICATED VALVE FOR LOW PRESSURES
Filed July 2, 1937
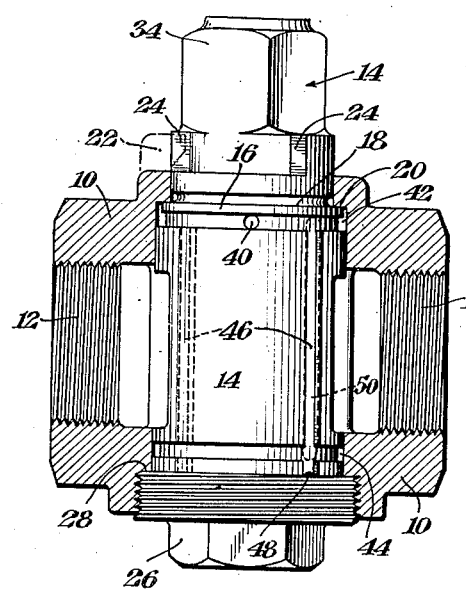
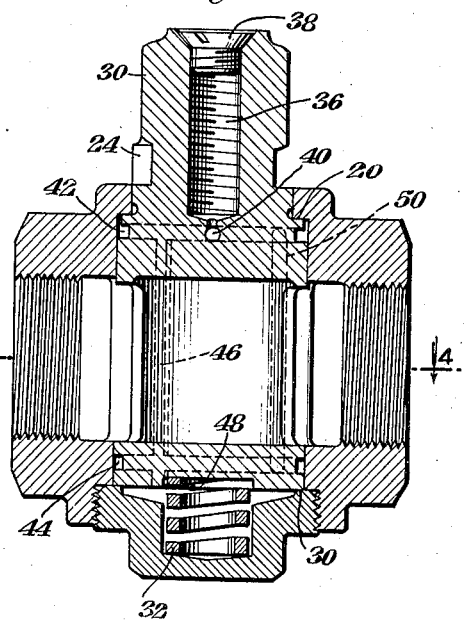
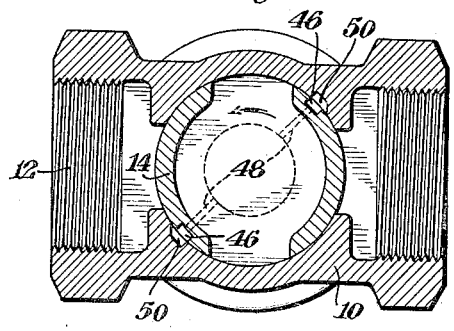
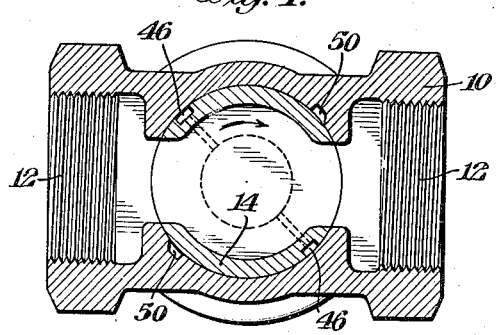
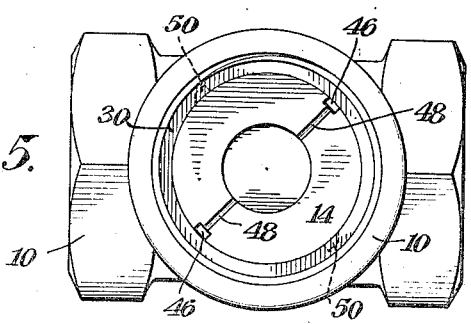
INVENTOR
Foster Milliken
BY
ATTORNEY Patented Jan. 31, 1939

2,145,628

UNITED STATES PATENT OFFICE 2,145,628

LUBRICATED VALVE FOR LOW PRESSURES

Foster Milliken, Lawrence, N. Y., assignor to Milliken Valve Corporation, a corporation of New York Application July 2, 1937, Serial No. 151,633

2 Claims. (Cl. 251—93)

This invention relates to an improved lubricated plug valve.

The valve which is the subject-matter of this invention is primarily intended to meet the demand for an inexpensive valve for comparatively low line pressures which is so simple in construction that the most ignorant laborer cannot fail to operate it properly. Features of this valve are that it will open and close quickly with only a quarter-turn; under normal conditions it can be furnished fully lubricated and will not require any re-lubrication for a reasonable period of time so it will operate under the least possible upkeep. It will give a positive shut-off when in closed position, and there are normally no projecting parts to catch the operator's clothing. Also the valve has no parts which can be easily removed and so lost or stolen.

The valve which is here described is a cylindrical plug lubricated valve of the general type described in my copending application, Serial No. 66,375, filed February 29, 1936, which more fully describes the advantages of this general type of valve.

My invention can be readily understood by reference to the illustrative example shown in the accompanying drawing, in which Fig. 1 represents a vertical section of the body showing the plug in place; Fig. 2 is a vertical section of the body plug and bottom cover showing the valve in open position; Fig. 3 is a horizontal section through the middle of the valve showing the valve in closed position; Fig. 4 is a section similar to Fig. 3 showing the valve with the plug in open position, and Fig. 5 is a bottom view of the valve (looking upward) with the bottom cover removed.

In the drawing, the numeral 10 designates the valve body having ports 12 which are here shown as threaded to take pipe connections. Obviously other types of connections could be employed such as flanged joints. The numeral 14 designates the plug which is adapted to pivot in the body. Near the upper part of the body 10 is the ring-shaped portion 16 having a seating surface 18 adapted to bear against the shoulder 20 of the plug. The body 10 is arranged with a stop 22 which engages the plug stop 24 to limit rotation of the plug to one-quarter turn in opening or closing the valve. The body 10 is provided with a bottom cover 26 which seats itself against the body on the body seat 28. It will be noted in Fig. 2 that the cover 26 extends inwardly as indicated at 30 to provide a bottom bearing for the plug 14. This plug should be made of such length that screwing the cover plate 26 against the seat 28 will not cause the plug to bind but will permit only very slight vertical movement of the plug. The bottom cover 26 is recessed to receive spring 32 and this recess likewise serves as a lubricant receptacle to supply lubricant under the bottom of the plug. This lubricant lubricates the contact area of the plug with the bearing surface 30, and also tends to assist spring 32 in maintaining an upward pressure on the plug so that shoulder 20 will bear against seat 18.

The stem 34 is squared to receive the usual operating wrench and is recessed to provide a lubricant receptacle 36. Since this valve will frequently be used in service where re-lubrication is not necessary, the lubricant receptacle 36 is shown as being closed by the simple countersunk screw 38. Obviously other forms of closure can be employed such as the ordinary form of pressure screw or if desired special types of pressure screws can be used as shown and described in the aforesaid application, Serial No. 66,375. As an alternative, I may use a nipple containing a check valve.

The lubricant receptacle 36 opens at the bottom into a horizontal passage 40 which runs diametrically through the plug with its ends opening into horizontal lubricant channel 42. It is to be noted that channel 42 extends up and around shoulder 20 so that the lubricant in this channel can assist in sealing the head of the valve and can supply lubricant to the bearing between shoulder 20 and seat 18. As is well known, if the valve is to be used for service where re-lubrication will be necessary, a ball check valve is preferably provided between lubricant receptacle 36 and passage 40.

A lower horizontal lubricant channel 44 is formed in the plug near its bottom and the channels 42 and 44 are connected by the two diametrically opposite vertical channels 46 which also are cut in the plug. These vertical channels run all the way to the bottom of the plug and connect with the small horizontal lubricant channels 48 (see Fig. 5) so that the lubricant in the various lubricant channels is directly connected to the lubricant in the bottom cover 26.

Two additional vertical lubricant channels 50 are provided, but these, instead of being cut in the plug, are cut in the body. They are arranged diametrically opposite to each other on an axis which forms an angle of 90° with the axis of the channels 46 when the valve is open as shown in Fig. 4, with the result that the open faces of the channels 46 and the channels 50 are opposite each other when the valve is closed as shown in Fig. 3. By virtue of this arrangement, it is not necessary for the vertical channels 50 to run up and down far enough to overlie the horizontal channels 42 and 44 though they may do so as shown. Lubricant will be supplied to the channels 50 from the channels 46 when the valve is in closed position. I have found that it is particularly advantageous to use this arrangement wherein the vertical lubricant channels overlie each other in one position of the valve, for the contact of the lubricant from one to the other seems to keep the surface of the lubricant from becoming caked or hardened in any way so that its efficiency will be lowered. Also by this arrangement, in opening or closing this valve, neither of the vertical lubricant ducts in the face of the plug cross the port openings in the body, thus preventing the washing away of lubricant in said ducts by the liquid or gas flowing through the line when same are exposed in passing the body ports. This is a most important feature in any lubricated valve, giving effective service, with the use of a minimum amount of lubricant.

In like manner, in opening or closing this valve the ports of the plug never cross the body lubricant ducts. This again is a most important feature because if the plug port should cross these ducts there is always danger of the lubricant dropping out of said ducts into the plug port. When a valve is to be operated with the minimum amount of lubricant, it is most important that no lubricant be lost into the pipe line. Accordingly, I get the full benefit of four vertical lubricant channels without the danger of loss of lubricant usual with such a construction, which is very important with a valve intended to have a long use without re-lubrication.

It is of course permissible, instead of the arrangement shown, to arrange the channels so that they will overlie each other when the valve is in open position and be positioned with their axes forming an angle of 90° when the valve is in closed position.

After the valve parts are fabricated and properly machined, the plug is inserted in the body so that the valve is in the closed positioned shown in Fig. 3. Spring 32 is inserted in cover 26 and the cover is filled with heavy, viscous lubricant and then screwed into position. Similar lubricant is then forced into the plug lubricant receptacle 36 and pressure is maintained until this lubricant fills all the ducts in the plug and body, setting up lubricant pressure in the lower lubricant chamber. The plug is preferably operated several times while the lubricant is still under pressure. The pressure is then taken off and the screw 38 inserted.

With this plug, when the valve is in closed position, the line pressure acting against the face of the plug forces the plug over so that the further wall of the plug is in perfect contact with the valve body, thus preventing what is known as "port leaks". At the same time, the line pressure may exert some pressure either directly under the plug, or against the lubricant in one of the vertical channels, which pressure is transmitted to the lubricant in the bottom cover 26 tending to assist spring 32 in holding shoulder 20 against seat 18 thereby preventing head leaks. In fact, the higher the line pressure, the tighter the head becomes, which is contrary to the fact with most valves.

It is further to be noted that this type head construction is obtained without the use of packing or gaskets in the head and this solid head construction is a feature greatly appreciated by users of valves who are accustomed through necessity to frequently replacing packing and gaskets.

It is to be understood that the example described is given only by way of illustration and that the same may be modified in many particulars without departing from the spirit of my invention.

What I claim is:

1. In a valve of the type described having a body with a plug seat, a plug rotatable in said seat and ports in the body and the plug adapted to be moved into and out of registration by such rotation, a coacting seat in the body and a shoulder on the plug to form a head seat when the plug is forced towards the head, a bottom cap for the body removable for insertion of the plug, a circumferential bottom seat for the plug formed on said cap, a pair of diametrically oppositely arranged vertical lubricant channels formed in the face of the plug, a second pair of oppositely arranged vertical lubricant channels formed in the face of the body, an upper circumferential lubricant duct formed in the plug adjacent the top of the plug and connecting with the vertical lubricant channels, a lower circumferential lubricant duct formed in the plug adjacent the base of the plug and connecting with the vertical lubricant channels, and horizontal lubricant passages of substantial cross-sectional area cut in the bottom surface of the plug and connecting directly with the oppositely disposed vertical lubricant channels formed in the plug, said horizontal lubricant passages forming a symmetrical design on the bottom surface of the plug so that lubricant pressure will act in these passages freely and equally against the bottom surface of the plug, and means for introducing lubricant under pressure into such channels, ducts and passages.

2. A valve as claimed in claim 1 having horizontal lubricant passages of substantial cross-sectional area cut in the bottom surface of the plug running diametrically inwardly from the point where the oppositely disposed vertical lubricant channels cut in the plug reach the base of the plug, a centrally disposed recess formed in the bottom cover, said horizontal lubricant passages connecting directly with said recess.

FOSTER MILLIKEN.